(12) United States Patent
Goringe et al.

(10) Patent No.: US 8,472,612 B1
(45) Date of Patent: Jun. 25, 2013

(54) CALL CENTER CUSTOMER QUEUE SHORTCUT ACCESS CODE

(75) Inventors: Chris Goringe, Seven Hills (AU); Alex M. Krumm-Heller, Gladesville (AU); Alan Green, Penrith (AU); Peter D. Runcie, Bilgola Plateau (AU); Melanie L. Smith, Rozelle (AU)

(73) Assignee: Avaya Inc., Basking Ridge, NJ (US)

( * ) Notice: Subject to any disclaimer, the term of this patent is extended or adjusted under 35 U.S.C. 154(b) by 2290 days.

(21) Appl. No.: 10/768,894

(22) Filed: Jan. 29, 2004

(51) Int. Cl.
*H04M 3/00* (2006.01)

(52) U.S. Cl.
USPC ............................ 379/266.01; 379/265.01

(58) Field of Classification Search
USPC ............ 379/266.01, 265.01, 265.02, 309, 379/266.06, 265.13, 266.03
See application file for complete search history.

(56) References Cited

U.S. PATENT DOCUMENTS

| | | | |
|---|---|---|---|
| 4,163,124 A | 7/1979 | Jolissaint | |
| 4,567,323 A | 1/1986 | Lottes et al. | |
| 4,737,983 A | 4/1988 | Frauenthal et al. | |
| 4,797,911 A | 1/1989 | Szlam et al. | |
| 4,894,857 A | 1/1990 | Szlam et al. | |
| 5,001,710 A | 3/1991 | Gawrys et al. | |
| 5,097,528 A | 3/1992 | Gursahaney et al. | |
| 5,101,425 A | 3/1992 | Darland | |
| 5,155,761 A | 10/1992 | Hammond | 379/67 |
| 5,164,983 A | 11/1992 | Brown et al. | |
| 5,185,782 A | 2/1993 | Srinivasan | |
| 5,206,903 A | 4/1993 | Kohler et al. | |
| 5,210,789 A | 5/1993 | Jeffus et al. | |
| 5,274,700 A | 12/1993 | Gechter et al. | |

(Continued)

FOREIGN PATENT DOCUMENTS

| CA | 2143198 | 1/1995 |
|---|---|---|
| CA | 2174762 | 3/1996 |

(Continued)

OTHER PUBLICATIONS

Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.

(Continued)

*Primary Examiner* — Amal Zenati
(74) *Attorney, Agent, or Firm* — Sheridan Ross P.C.

(57) ABSTRACT

An improved system and method that allows a customer waiting, for example, in a call center queue to leave contact information, a preferred callback time frame and drop out of the queue. The system and method computes a priority access code and a time frame when its use is valid that coincides with the preferred callback time frame of the call center or customer service department, etc. In response to the request for a priority access code to use when the customer calls back, the system and method sends the customer a callback message including the priority access code and time frame when its use is valid. During the time frame the priority access code is valid, the customer contacts the call center for example by calling back or by initiating a web chat, etc., re-enters the queue and uses the priority access code. This allows the customer to enter a general queue at their convenience and at a higher priority or go straight to the head of the general queue. Alternatively, the customer may enter a callback queue, which already has a higher priority than the general queue.

46 Claims, 5 Drawing Sheets

605

| Assigned transaction number. | Channel type to send callback message and contact information (telephone or cell phone (PHONE), email (EMAIL), facsimile (FAX), pager (PAGER), or text messaging (SMS)) | Assigned priority access code. | Computed time frame the priority access code must be used by the customer. | Pointer to customer entry in customer database to link data structure with information already existing in customer database, if any. |
|---|---|---|---|---|

U.S. PATENT DOCUMENTS

| | | | |
|---|---|---|---|
| 5,278,898 A | 1/1994 | Cambray et al. | |
| 5,291,550 A | 3/1994 | Levy et al. | |
| 5,299,260 A | 3/1994 | Shaio | |
| 5,309,513 A | 5/1994 | Rose | |
| 5,335,268 A | 8/1994 | Kelly, Jr. et al. | |
| 5,335,269 A | 8/1994 | Steinlicht | |
| 5,390,243 A | 2/1995 | Casselman et al. | |
| 5,402,474 A | 3/1995 | Miller et al. | |
| 5,436,965 A | 7/1995 | Grossman et al. | |
| 5,444,774 A | 8/1995 | Friedes | |
| 5,469,503 A | 11/1995 | Butensky et al. | |
| 5,469,504 A | 11/1995 | Blaha | |
| 5,473,773 A | 12/1995 | Aman et al. | |
| 5,479,497 A | 12/1995 | Kovarik | |
| 5,500,795 A | 3/1996 | Powers et al. | |
| 5,504,894 A | 4/1996 | Ferguson et al. | |
| 5,506,898 A | 4/1996 | Costantini et al. | |
| 5,530,744 A | 6/1996 | Charalambous et al. | |
| 5,537,470 A | 7/1996 | Lee | |
| 5,537,542 A | 7/1996 | Eilert et al. | |
| 5,544,232 A | 8/1996 | Baker et al. | |
| 5,546,452 A | 8/1996 | Andrews et al. | |
| 5,592,378 A | 1/1997 | Cameron et al. | |
| 5,592,542 A | 1/1997 | Honda et al. | |
| 5,594,726 A | 1/1997 | Thompson et al. | |
| 5,606,361 A | 2/1997 | Davidsohn et al. | |
| 5,611,076 A | 3/1997 | Durflinger et al. | |
| 5,627,884 A | 5/1997 | Williams et al. | |
| 5,642,515 A | 6/1997 | Jones et al. | |
| 5,657,382 A | 8/1997 | Tamagawa et al. | |
| 5,684,872 A | 11/1997 | Flockhart et al. | |
| 5,684,874 A | 11/1997 | Yagyu et al. | |
| 5,684,964 A | 11/1997 | Powers et al. | |
| 5,689,698 A | 11/1997 | Jones et al. | |
| 5,696,811 A | 12/1997 | Maloney et al. | |
| 5,701,295 A | 12/1997 | Bales et al. | 370/271 |
| 5,703,943 A | 12/1997 | Otto | |
| 5,713,014 A | 1/1998 | Durflinger et al. | |
| 5,742,668 A | 4/1998 | Pepe et al. | |
| 6,009,157 A | 12/1999 | Bales et al. | 379/209 |
| 6,141,328 A * | 10/2000 | Nabkel et al. | 370/259 |
| 6,259,786 B1 * | 7/2001 | Gisby | 379/266.01 |
| 6,724,885 B1 * | 4/2004 | Deutsch et al. | 379/265.02 |
| 6,738,353 B2 | 5/2004 | Chong | |
| 7,124,098 B2 | 10/2006 | Hopson et al. | |
| 7,245,711 B2 * | 7/2007 | Margolis | 379/209.01 |
| 7,260,203 B2 | 8/2007 | Holt et al. | |
| 7,274,787 B1 * | 9/2007 | Schoeneberger | 379/265.01 |
| 2006/0177034 A1 | 8/2006 | Reding et al. | |

FOREIGN PATENT DOCUMENTS

| | | |
|---|---|---|
| EP | 0501189 | 9/1992 |
| EP | 0 701 358 A1 | 3/1996 |
| EP | 0740450 | 10/1996 |
| EP | 0772335 | 5/1997 |
| EP | 0829996 | 3/1998 |
| EP | 0855826 | 7/1998 |
| EP | 0863651 | 9/1998 |
| EP | 0866407 | 9/1998 |
| EP | 899673 | 3/1999 |
| EP | 998108 | 5/2000 |
| EP | 1 081 930 A1 | 3/2001 |
| EP | 1091307 | 4/2001 |
| EP | 1 120 729 A2 | 8/2001 |
| EP | 1150236 | 10/2001 |
| EP | 1 564 977 A3 | 2/2006 |
| GB | 2273418 | 6/1994 |
| GB | 2290192 | 12/1995 |
| WO | WO 96/07141 | 3/1996 |
| WO | WO 97/28635 | 8/1997 |
| WO | WO 98/56207 | 12/1998 |

OTHER PUBLICATIONS

Avaya, Inc. Business Advocate Options, at http://www.avaya.com, downloaded on Feb. 15, 2003, Avaya, Inc. 2003.

Avaya, Inc. Business Advocate Product Summary, at http://www.avaya.com, downloaded on Feb. 15, 2003, Avaya, Inc. 2003, 3 pages.

Avaya, Inc. CentreVu Advocate, Release 9, User Guide, Dec. 2000.

Avaya, Inc., "Better Implementation of IP in Large Networks," Avaya, Inc. 2002, 14 pages.

Avaya, Inc., "The Advantages of Load Balancing in the Multi-Call Center Enterprise," Avaya, Inc., 2002, 14 pages.

Avaya, Inc., "Voice Over IP Via Virtual Private Networks: An Overview," Avaya, Inc., Feb. 2001, 9 pages.

Bellsouth Corp., "Frequently Asked Questions—What is a registrar?," available at https://registration.bellsouth.net/NASApp/DNSWebUI/FAQ.jsp, downloaded Mar. 31, 2003, 4 pages.

Chavez, David, et al., "Avaya MultiVantage Software: Adapting Proven Call Processing for the Transition to Converged IP Networks," Avaya, Inc., Aug. 2002.

Coles, Scott, "A Guide for Ensuring Service Quality in IP Voice Networks," Avaya, Inc., 2002, pp. 1-17.

Dawson, "NPRI's Powerguide, Software Overview" Call Center Magazine (Jun. 1993), p. 85.

Doo-Hyun Kim et al. "Collaborative Multimedia Middleware Architecture and Advanced Internet Call Center," Proceedings at the International Conference on Information Networking (Jan. 31, 2001), pp. 246-250.

E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz, printed Feb. 10, 2003; 8 pages.

Foster, Robin, et al., "Avaya Business Advocate and its Relationship to Multi-Site Load Balancing Applications," Avaya, Inc., Mar. 2002, 14 pages.

Geotel Communications Corporation Web site printout entitled "Intelligent CallRouter" Optimizing the Interaction Between Customers and Answering Resources., 1998, 6 pages.

John H.L. Hansen and Levent M. Arsian, Foreign Accent Classification Using Source Generator Based Prosodic Features, IEEE Proc. ICASSP, vol. 1, pp. 836-839, Detroit USA (May 1995).

L.F. Lamel and J.L. Gauvain, Language Identification Using Phone-Based Acoustic Likelihood, ICASSP-94, date unknown; 4 pages.

Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.

Levent M. Arsian, Foreign Accent Classification in American English, Department of Electrical Computer Engineering, Duke University, Thesis, pp. 1-200 (1996).

MIT Project Oxygen, Pervasive, Human-Centered Computing (MIT Laboratory for Computer Science) (Jun. 2000) pp. 1-15.

Presentation by Victor Zue, The MIT Oxygen Project, MIT Laboratory for Computer Science (Apr. 25-26, 2000) 9 pages.

Stevenson et al.; "Name Resolution in Network and Systems Management Environments"; http://netman.cit.buffalo.edu/Doc/DStevenson/NR-NMSE.html; printed Mar. 31, 2003; 16 pages.

"Applications, NPRI's Predictive Dialing Package," Computer Technology (Fall 1993), p. 86.

"Call Center Software You Can't Outgrow," Telemarketing® (Jul. 1993), p. 105.

"Domain Name Services," available at http://www.pism.com/chapt09/chapt09.html, downloaded Mar. 31, 2003, 21 pages.

"eGain's Commerce 2000 Platform Sets New Standard for eCommerce Customer Communications," Business Wire (Nov. 15, 1999), 3 pages.

"Internet Protocol Addressing," available at http://samspade.org/d/ipdns.html, downloaded Mar. 31, 2003, 9 pages.

"Product Features," Guide to Call Center Automation, Brock Control Systems, Inc., Activity Managers Series™, Section 5—Company B120, p. 59, 1992.

"Product Features," Guide to Call Center Automation, CRC Information Systems, Inc., Tel-ATHENA, Section 5—Company C520, p. 95, 1992.

"VAST™, Voicelink Application Software for Teleservicing®," System Manager User's Guide, Digital Systems (1994), pp. ii, vii-ix, 1-2, 2-41 through 2-77.

"When Talk Isn't Cheap," Sm@rt Reseller, v. 3, n. 13 (Apr. 3, 2000), p. 50.

Virtual Hold® Technology "Solutions—WebConnect" (printed Oct. 9, 2003) available at http://www.virtualhold.com/webconnect.htm, 2 pages.

Virtual Hold® Technology "Solutions—FAQ" (printed Oct. 9, 2003) available at http://www.virtualhold.com/solutionsfaq.htm, 2 pages.

Virtual Hold® Technology "Solutions—Concierge" (printed Oct. 9, 2003) available at http://www.virtualhold.com/concierge.htm, 2 pages.

Virtual Hold® Technology "Solutions—Overview" (printed Oct. 9, 2003) available at http://www.virtualhold.com/overview.htm, 2 pages.

Virtual Hold® Technology "Solutions—Rendezvous" (printed Oct. 9, 2003) available at http://www.virtualhold.com/rendezvous.htm, 2 pages.

NetCall Telecom "NetCall Directory™" (printed Oct. 9, 2003) available at http://www.netcall.com/solutions/directory.asp, 2 pages.

NetCall Telecom "NetCall Alert™" (printed Oct. 9, 2003) available at http://www.netcall.com/solutions/alert.asp, 2 pages.

NetCall Telecom "NetCall HotDesk™" (printed Oct. 9, 2003) available at http://www.netcall.com/solutions/hotdesk.asp, 2 pages.

NetCall Telecom "NetCall NetCall800™" (printed Oct. 9, 2003) available at http://www.netcall.com/solutions/netcall800.asp, 1 page.

NetCall Telecom "NetCall FAQs" (printed Oct. 9, 2003) available at http://www.netcall.com/solutions/queuebuster_faqs.asp, 3 pages.

NetCall Telecom "NetCall QueueBuster" (printed Oct. 9, 2003) available at http://www.netcall.com/solutions/queuebuster.asp, 2 pages.

NetCall USA Brochure entitled "QueueBuster™ Take Your Customers Off Hold" (undated), 6 pages.

"The GM API—Table of Contents" (printed Oct. 9, 2003), available at http://www.myri.com/scs/GM/doc/gm_toc.html, 1 page.

"The GM API—Copyright Notice" (printed Oct. 9, 2003), available at http://www.myri.com/scs/GM/doc/gm_1.html, 2 pages.

"The GM API—About this Document" (printed Oct. 9, 2003), available at http://www.myri.com/scs/GM/doc/gm_2.html, 2 pages.

"The GM API—GM Overview" (printed Oct. 9, 2003), available at http://www.myri.com/scs/GM/doc/gm_3.html, 2 pages.

"The GM API—Definitions" (printed Oct. 9, 2003), available at http://www.myri.com/scs/GM/doc/gm_4.html, 2 pages.

"The GM API—Sending Messages" (printed Oct. 9, 2003), available at http://www.myri.com/scs/GM/doc/gm_8.html, 2 pages.

"The GM API—Receiving Messages" (printed Oct. 9, 2003), available at http://www.myri.com/scs/GM/doc/gm_9.html, 7 pages.

"The GM API—GM Constants and Macros" (printed Oct. 9, 2003), available at http://www.myri.com/scs/GM/doc/gm_15.html, 1 page.

"The GM API—Variable Index" (printed Oct. 9, 2003), available at http://www.myri.com/scs/GM/doc/gm_19.html, 1 page.

"The GM API—Token Reference" (printed Oct. 9, 2003), available at http://www.myri.com/scs/GM/doc/gm_17.html, 2 pages.

"The GM API—Glossary" (printed Oct. 9, 2003), available at http://www.myri.com/scs/GM/doc/gm_18.html, 2 pages.

\* cited by examiner

600

| First name | Last name | Time to live (at least as long as time frame for customer to use priority access code.) | Subject matter of customer's call. | Transaction channel type- did customer contact via telephone (PHONE), web chat (WC), email (EMAIL), or facsimile (FAX)? | Contact information- telephone or cell phone (PHONE), email address (EMAIL), facsimile number (FAX), pager (Pager), text messaging (SMS). | Timeframe convenient for customer to contact call center. |
|---|---|---|---|---|---|---|

| Assigned transaction number. | Channel type to send callback message and contact information (telephone or cell phone (PHONE), email (EMAIL), facsimile (FAX), pager (PAGER), or text messaging (SMS)) | Assigned priority access code. | Computed time frame the priority access code must be used by the customer. | Pointer to customer entry in customer database to link data structure with information already existing in customer database, if any. |
|---|---|---|---|---|

| Priority access code entered by customer. | Time frame for this particular priority access code. | Pointer to customer entry in database to retrieve customer information. |
|---|---|---|

*Fig. 5C*

CALL CENTER CUSTOMER QUEUE SHORTCUT ACCESS CODE

FIELD OF THE INVENTION

The present invention is directed generally to contact centers and specifically to contact management in contact centers.

BACKGROUND OF THE INVENTION

Inevitably, you have waited in a queue for your call to be answered by the next available agent in a call center organization, such as a customer service department, or technical support department, etc. Rather than increase costs by increasing the number of agents available to answer calls 24 hours a day, businesses use music to calm customers and queue prompts to keep customers informed how long the queue is and request customers not to hang-up.

There are at least two products, QueueBuster™ and Virtual Hold® that allows a customer to hang-up and receive a return callback from the business via the telephone without the customer losing their position in the queue. For both products, the customer is told the estimated queue wait time and asked if they want a callback from the business. If customers want the callback, they are prompted to say their name. Virtual Hold may prompt the customer to record a callback time and telephone number in addition to the customer's name. Otherwise, Virtual Hold and QueueBuster collects the customer's telephone number using dialed number identification service (DNIS), automatic number identification (ANI), or digits from the customer using the telephone keypad, etc. These products then save the customer's place in the queue and call back the customer when the customer's placeholder is first in line to speak to the next available agent. Both Virtual Hold and QueueBuster retry calling the customer a set number of times if the customer is not available. Virtual Hold also provides the same options to online customers.

However, these products initiate the customer callback, which may increase costs to the business, as the callback is usually via a telephone. Additionally, these products rely on the customer being able to receive the callback immediately or at the scheduled callback time. Unfortunately, a customer may become busy immediately or at the scheduled callback time or not even near the telephone at the scheduled callback time. Hence, the customer loses their place in the customer queue, which requires the customer to call the call center and begin the process again at the end of the queue.

SUMMARY OF THE INVENTION

The present invention is directed generally to a customer's use of an access code in a contact center to obtain preferential queue treatment relative to customers not using an access code. As used herein, a "contact center" refers to any architecture for servicing contacts, such as a call center, while a "contact" refers to a communication conveyed by any medium, whether wired or wireless, and including but not limited to telephone, Voice Over Internet Protocol or VoIP, web chat, email, instant message, short message service or sms, pager, and facsimile communications.

The access code can be any suitable form. For example, the access code could be a special phone number (which directs the customer to a special set of agents and/or queue), a special address (which directs the customer to a special set of agents and/or queue) (e.g., an IP address, a Universal Resource Locator, etc.), a password, an identifier of the customer (e.g., a unique personal identification number), a pseudorandom number, and the like.

In one embodiment, the invention allows a customer having a contact enqueued in a contact center queue opt out of the queue in exchange for receiving a priority access code. The access code may be provided before or after the current contact is terminated. Preferably, the access code is provided in a separate contact with the customer by the contact center after a predetermined delay, such as when a placeholder in the'queue (which represents the queue position of the terminated current contact) reaches a specified queue position (e.g., the head of the queue). The details regarding the separate contact are typically provided to the contact center before the customer terminates the contact. Rather than provide the customer in the current contact with options regarding how to receive the access code, the details could be provided in a subsequent contact to the contact number or address of the current contact. In any event, the contact center sends the customer a subsequent message, via the preferred contact method (email, pager, facsimile, telephone or cell phone, text messaging, etc.).

The subsequent message includes the access code and the time frame(s) the customer may use the access code. The time frame(s) can be one or more windows of time that begins at a specified time and/or ends at a specified time. Typically, the access code has a set time to live and cannot be used after the time to live has expired. In this way, the same access code cannot be used over and over again by the customer to obtain preferential treatment at the expense of other enqueued customers.

When the code is enabled, the access code allows the customer to contact the contact center at a time that is convenient for the customer and the contact center rather than waiting for a callback at a specified time and place. The priority access code allows the customer to enter a general queue at a higher priority or at the top of the queue, thereby preventing the customer from having long, frustrating wait times and providing higher levels of customer satisfaction. The access code could also be used to streamline customer-agent follow-up (e.g., when the contact center has some follow-up for a customer request, the contact center can invite the customer to contact it again using the access code.

The present invention can use a callback method that is relatively inexpensive to notify the customer of the access code. The present invention can send the customer the priority access code in a message using inexpensive means, such as, email, pager, facsimile, text messaging. The invention can also reduce the costs associated with calling back the customer if several attempts are necessary, such as toll charges if calling using the PSTN. The present invention can leave the information via a telephone or cell phone voice mail message preferably using IP telephony to drastically reduce toll charges. Similarly, the present system and method may call via the PSTN later in the day to make use of reduced toll charges and use of available agents.

These and other advantages will be apparent from the discussion below.

BRIEF DESCRIPTION OF THE DRAWINGS

FIG. 5A is a data structure according to the present invention that includes customer contact information.

FIG. 5B is a data structure according to an embodiment of the present invention for scheduling the contact transaction request.

FIG. 5C is a data structure according to an embodiment of the present invention for queuing the customer when the customer calls back.

DETAILED DESCRIPTION

Figure 1:
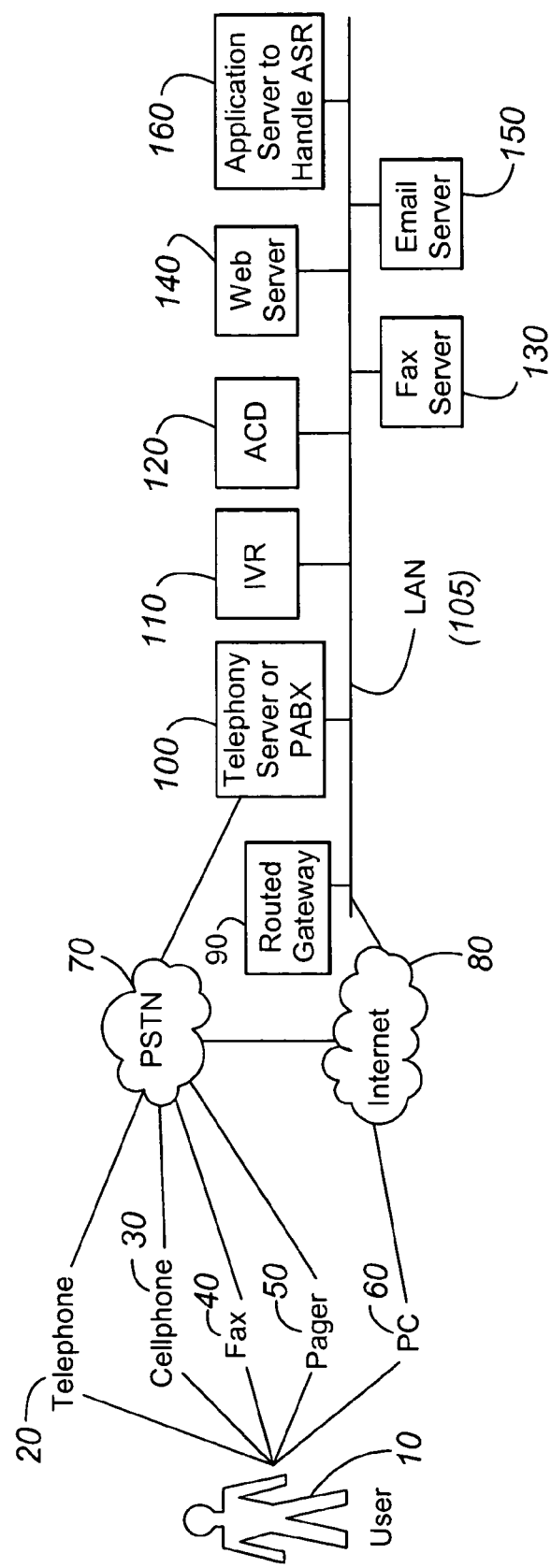
FIG. 1 is a block diagram according to an embodiment of the present invention.

FIG. 1 is a block diagram of a business environment, such as, an enterprise (college, government office, call center, etc.) utilizing the present invention. FIG. 1 includes a customer 10 with multiple number of communication channels to contact the enterprise. The communication channels include telephone 20, cell phone 30 with or without short message service (SMS) for text messaging, facsimile 40, pager 50 with or without alphanumeric paging service for text messaging. The PC 60 has a browser which allows the customer to initiate a web chat with a business, such as, a call center. PC 60 may also include IP softphone application software for Internet telephony, email application software, or facsimile software to send and receive facsimiles via the Internet (80). IP softphone application software allows the PC 60 to function as a desktop IP phone. Alternatively, the customer 10 may have a desktop IP telephone to place a telephone call using the Internet 80. As broadband communications become more widely used, customers should be able to use video conferencing to communicate with call centers or businesses, etc.

The business in FIG. 1 shows a router/gateway 90, telephony server 100, interactive voice response system (IVR) 110, automatic call distributor (ACD) 120, facsimile server 130, web server 140, email server 150 and application server 160.

The telephony server 100 manages the switching of telephone calls for internal users, such as call center agents (not shown), and answers and transfers inbound and outbound calls received from the PSTN 70 or Internet 80. Telephony server 100 operating on LAN 105 allows the business to reduce costs by maintaining one network instead of two (the data and telephone) and reduce charges from toll calls by routing some calls over the packet switched network such as Internet 80. The telephony server 100 has analog and digital port boards (not shown) to support legacy analog and digital telephones 20, 30 and facsimiles 40. Telephony server 100 has an IP board to support IP desktop telephones (not shown) on the agent desktops or an IP softphone application on an agent's PC (not shown).

The telephony server 100 has a processor and memory (not shown) which manages the switching of the calls within the business and inbound and outbound calls. The telephony server 100 hard disk-drive (not shown) stores the call processing and maintenance software; administration software to allow for administration either via a web browser or at an administrator's terminal (not shown) using a graphical user interface or command line interface; and configuration and user administered data, such as, extensions and user PINS.

The callback message, which includes the priority access code and time frame for its use may be sent via the telephony server 100. Messages to a facsimile 40, pager 50, analog or digital cell phone 30 or telephone 20 are routed to the PSTN 70. IP telephone calls are also sent via the telephony server 100 and routed the router/gateway 90 to the Internet 80. Emails, text messages to a cell phone 30 or pager 50, and internet facsimiles messages may originate from the email server 150, an agent PC (not shown), or facsimile server 130 and routed to the router/gateway 90 to the Internet 80.

When the customer 10 dials the IVR 110 access telephone number, the call is transferred to the IVR 110. IVR 110 presents a front-end interface to collect and interpret information. IVR 110 provides a set menu of options to callers using pre-recorded digital audio prompts and navigates from one menu option to another depending on the customer's menu choice. Customers respond to an IVR prompt using touch-tone (DTMF) telephones 20, 30 or speak their response if the IVR has an automatic speech response (ASR) resource. The IVR uses automatic speech recognition (ASR) resources to interpret the customer's voice response or uses dual tone multi-frequency (DTMF) resources on the IVR 110 to respond to the customer's DTMF response. Additional ASR and DTMF resources may be available in a separate application server 160 in a large enterprise if needed.

The access code agent, the software implementing the present invention, interfaces with ACD 120 to provide sophisticated routing and transaction services. The access code agent routes the customer call, email, facsimile or web chat contact to the appropriate queue, manages the call in the queue and the customer call or web chat, email, facsimile contact until the appropriate agent answers the call or contact.

The automatic call distribution ACD 120 places the customer call into an ACD 120 queue. If the queue (actual and/or expected) wait time (and/or the queue occupancy level) is above a threshold, the access code agent instructs the IVR 110 to prompt the customer whether they would like to obtain a priority access code to use when they callback the call center at a later time. The access code agent also instructs the IVR 110 to collect the customer's contact information for a callback message, which includes the priority access code and the time frame it is valid. IVR 110 collects and stores the information in the customer database 260.

The priority access code allows the customer to progress faster within a queue. A queue may be skills based, that is, calls are sent to a particular queue because agents with a particular set of skills are assigned to the queue. Another queue may be a general queue and the customer's priority access code provides the customer 10 with a priority status within the queue. Alternatively a particular queue may be used only for customers that have called back and in this case, all calls in this particular queue are already of higher priority than those in the general queue.

When the customer 10 contacts a business using a web browser to initiate a web chat, the web server 140 interfaces with the ACD 120 for processing. For web chat customers, the web server 140 may present various web pages to advertise additional services or perhaps notify the customer 10 how much longer the wait is before the next agent becomes available to answer the web chat contact. While the customer 10 is waiting, the customer is placed in a queue by the ACD 120 for the next appropriate agent skilled to handle the customer's initiated web chat. If the number of contacts in the queue (and/or the expected or actual queue wait time) is above a threshold, the access code agent interfaces with the web server 140 to present to the customer 10 a web page that asks the customer if they want to callback the call center at a later time using a priority access code to enter the queue at a higher priority. If the customer 10 agrees to callback the business, the web page collects the pertinent customer contact information, a convenient time frame for the customer to call back, and ends the web chat. The message containing the access code is typically provided to the customer when the customer's queue position reaches a selected point in the queue. In one configuration, the customer's details remain in the call center queue and when they reach the selected queue position, the customer is provided with the access code.

The customer contact information is temporarily stored on the database residing on the web server 140. The web server 140 has the database interface software to retrieve data from a CGI script, for example, and store the information into a relational database such as customer database 260. It is up to the customer 10 to decide whether the customer prefers to callback the business via the telephone 20, 30 or contact the business again via the web chat channel. The priority access code will provide the customer 10 a priority status in either channel. Otherwise, the customer 10 may wait in the web chat queue for the next available agent.

Similarly, if the customer 10 contacts a business, such as a call center, using a particular email address or facsimile telephone, the contact is queued by ACD 120. ACD 120 determines if the time to respond to the contact is above a threshold. If the time to respond (the actual and/or expected wait time) and/or the queue occupancy level is above a threshold, the access code agent sends an email or facsimile message to the customer 10 to acknowledge receipt of the inquiry and this message may include a priority access code to be used if the inquiry is not answered by an appointed date and time. The customer 10 may include the priority access code in the subject line of the next email or facsimile message if the inquiry is not answered by the appointed date and time. Alternatively if the customer 10 desires to speak with an agent, the customer may use the priority access code to callback the call center and enter a queue at a higher priority. The priority access code is valid for use after the date and time the response was due.

Access code agent generates the callback message and interfaces with ACD 120 to schedule the transaction and send the callback message via the customer preferred communication channel 20, 30, 40, 50, 60. Using a random number generator, access code agent software generates a transaction number for each requested callback message and assigns a priority code to this transaction.

Additionally, the access code agent computes the time frame the priority access code is valid. The access code agent uses the time frame the customer 10 indicated was convenient to contact the enterprise and the time frame the particular agent queue answering this particular call is least likely to be busy. The computed time frame the priority access code is valid may be a period of hours, days or for a period of hours between certain days. The access code agent stores the information in the callback message transaction in the customer database 260.

Access code agent software sends the transaction to ACD 120, which schedules and sends the callback message transaction request immediately or after a delay, such as when a placeholder in the queue (which represents the queue position of the terminated current contact) reaches a specified queue position (e.g., the head of the queue) via the channel 20, 30, 40, 50, 60 requested by the customer 10 within, for example, an hour of the customer request. To ensure the callback message is sent via the customer 10 preferred channel, the transaction may have an associated channel type to send the callback message, which ensures the customer 10 is contacted as requested. As shown in FIG. 5B, the contact types include telephone or cell phone (PHONE), email address (EMAIL), facsimile number (FAX), pager (Pager), text messaging pager or cell phone (SMS). The channel type also includes the customer's contact address or telephone.

Sending the callback message via communication channels 20, 30, 40, 50, 60 using the present invention reduces the costs associated with calling back the customer 10 to leave the callback message. Sending the callback message is inexpensive when the process is automated and inexpensive channels such as email 150, facsimile 130, or a text message via an email account 150 is used to send the callback message, as agents are not needed to send the canned message through the packet switched network. For example, the access code agent interfaces with a script on the email server 150 and facsimile server 130 to compose the email (as well as text message to a cell phone or pager) or facsimile message sent via communication channel 30, 40, 50, 60 desired by the customer 10.

Similarly, using IP telephony to make calls to a customer's pager, cell phone or telephone and leaving a voice mail message drastically reduces toll charges. If a voice call is requested by the customer, the access code agent interfaces with the outbound predictive dialer (not shown). The access code agent creates a list of customers that the outbound predictive dialer (not shown) will call using the customer's contact telephone, cell phone number, or pager number. In this case, the outbound predictive dialer (not shown) is using available agents to leave the callback message on the customer's voice mail. When the customer's voice mail answers the call, the call is sent to the next available agent. The agent records on the customer's voice mail, the priority access code number and the computed time frame the priority access code is valid for the customer's use.

Of course, these available agents may also leave callback messages if there are problems sending the callback message via email, facsimile or text message. Instead of attempting to resend the callback message via a communication channel that previously failed, these agents may review the customer's record in the customer database 260 and determine the best way to resend the callback message via another communication channel 20, 30, 40, 50, 60. Problems sending emails, facsimiles or text messages are first noticed when a message returns regarding the failed delivery of the original message. There may be many causes of the failed delivery, for example, the outbound script on the email server 150 or facsimile server 130 may require additional commands to communicate with a particular cellular or pager service to send text messages, the ASR resource did not correctly translate the customer contact information recorded, or the customer's facsimile is incompatible with the facsimile server 130.

In small enterprises, the access code agent is co-resident with the IVR 110. Alternatively, when large amounts of processing power is required, the access code agent may reside on a separate application server (not shown).

Figure 2:
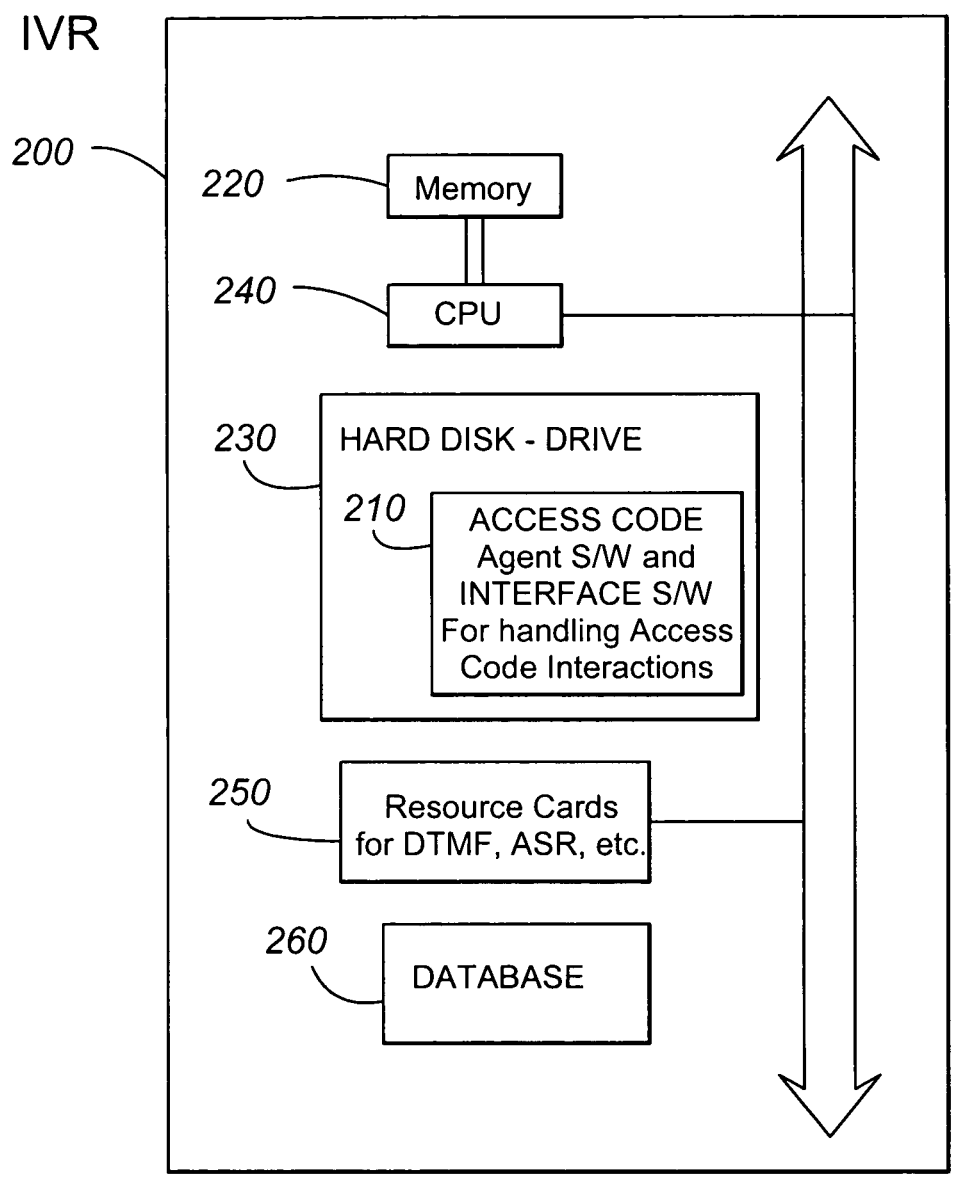
FIG. 2 is a block diagram of an IVR according to an embodiment of the present invention.

FIG. 2 is a block diagram of an IVR. The IVR 200 includes memory 220 and CPU 240. Hard disk storage 230 stores recorded prompts; the access code agent software and interface software for handling shortcut access code interactions 210; platform software for the operation, administration and maintenance of the IVR 200 such as backup, speech administration, etc. IVR 200 also includes a LAN card 360 (not shown), such as an Ethernet card to communicate with other equipment on LAN 105 (FIG. 1).

IVR 200 has resource cards 250 to handle digit collection from dual tone multi-frequencies (DTMF) telephones and automatic speech recognition (ASR) resources to understand customer responses when the customer 10 chooses to speak their responses. Other resources provided by the IVR include text to speech (TTS), voice processing (recording customer's responses, basic telephony control such as transfer, hanging-up, and answering the call sent by the telephony server.) The customer's recorded message includes the customer's first and last name, subject matter of call, contact information, and time frame convenient for the customer 10 to callback using a priority access code. As a result, IVR 200 may use its TTS resources to read back text in a file which includes the interpreted information to confirm the ASR interpreted and stored the customer's contact information properly.

In small businesses, IVR may include a relational database 260, which may be indexed to easily retrieve information. Alternatively, this database may be located on a separate host server. The customer database 260 stores customer account records. Of course, additional voice processing, DTMF, TTS and ASR resources may reside on another server, if necessary due to processing needs.

Figure 3:
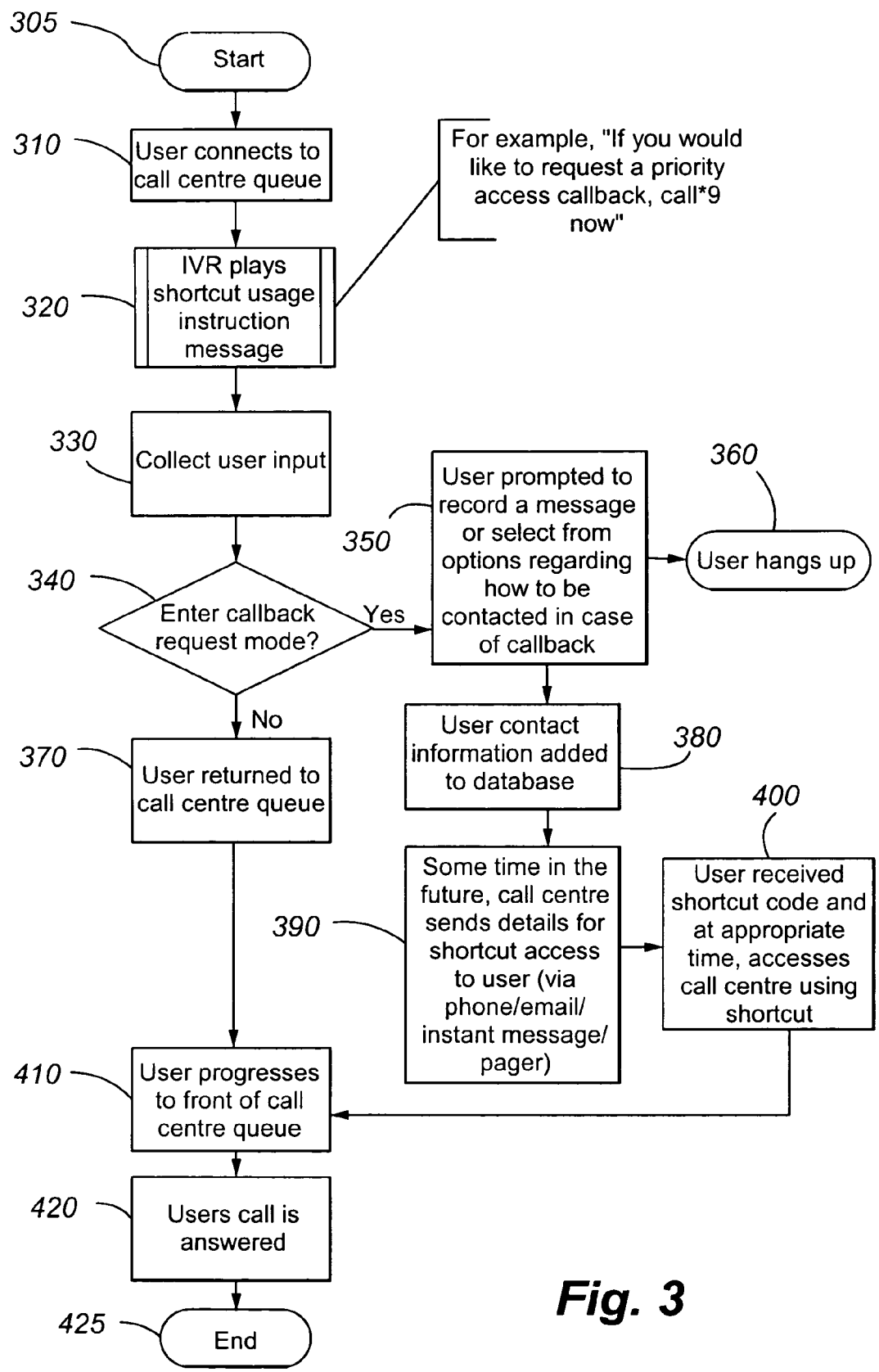
FIG. 3 is a flow chart according to an embodiment of the present invention.

FIG. 3 is a flow diagram of the present invention. The discussed implementation uses an IVR 110. In step 310, the customer, i.e., user enters a call center queue, for example. Of course, the present invention may be used in other business settings such as in the Internal Revenue Service (IRS) that has agents answering customer tax questions or resolving tax problems.

In step 320, the IVR 110 plays a prompt, such as, "The wait time for the next available agent is <estimated wait time>. If you would like to request a priority access callback, dial *9 now." The customer 10 may respond either by pressing the *9 keys on the telephone keypad 20, 30 or providing a verbal response by saying *9.

In step 330, the IVR 110 is waiting for the customer 10 to respond either verbally or using the touch-tone keys on his telephone 20, 30. If the customer 10 decides to get a priority access callback, the customer enters *9 and the IVR recognizes the input using its DTMF resources in step 340. Otherwise in Step 370, if the customer 10 does not respond with *9, the customer is returned to the call center queue.

In step 350, the access code agent software interfaces with the IVR 110 to prompt the customer 10 to record a message or select from options regarding how to leave contact information for the callback message. The customer 10 is providing contact information indicating the best way to send the priority access callback message. The recorded message includes the customer's first and last name, subject matter of the customer's call, contact information which includes any of the following information: telephone or cell phone number, email address, facsimile number, pager number, text messaging address and the time-frame convenient for the customer 10 to call back the call center. Alternatively, if the IVR 110 does not prompt the customer 10 for a time frame, the business uses the time frame its agents are least likely to be busy. If the time frame is over a longer period of time such as several days, the customer 10 will find a suitable time to call back. Preferably, the access code agent will compute a time frame this priority access code is valid which takes into account the customer's provided time frame and the block of time the call center is the least busiest. As previously stated, the customer contact information may be collected using voice recognition, DTMF or via a web browser.

The IVR 110 will use its ASR resources and DTMF resources to interpret the verbal or touch tone responses. The access code agent interfaces with the IVR 110 to save the information in a text file. IVR 110 TTS resources read back the contents of the text file to the customer 10 and confirm the customer's input. The customer contact information is added to the customer database 260 after the customer 10 confirms the input is correct. (Step 380). In step 360, once the customer 10 provides the contact information, the customer hangs up the telephone (or disconnects from the web chat.)

The customer contact information is stored in customer database 260 along with the time to live which is at least as long as the time frame for the customer 10 to use the priority access code, and the transaction channel type the customer 10 used to contact the call center. (FIG. 5A). Once the time to live expires, the contact information is suspect and should not be used to contact the customer.

The IVR 110 also captures the DNIS or ANI of the customer's telephone number or cell phone number if possible, or notes the customer 10 contacted the call center via a web chat, email or facsimile channel. This transaction channel type information is useful if the call center receives a delivery failure message for a sent callback message. In this case, the call center may attempt to resend the callback message using the contact information from the transaction channel type.

As noted above, the callback message may be sent before or after the customer terminates the current contact. In a preferred embodiment, a placeholder remains in the queue representing the terminated current contact. When the placeholder reaches a selected queue position (such as the head of the queue), the callback message is forwarded to the customer.

The access code agent generates the callback message transaction. The access code agent assigns a transaction number for the callback message and assigns a channel type to the callback message so that the message is sent via the proper channel desired by the customer. The access code agent also computes and assigns the priority access code; computes a time frame this priority access code should be valid; and includes a pointer to the customer entry in the customer database 260.

In step 390, the access code agent interfaces with the ACD 120 before the ACD 120 sends the callback message via the customer preferred communication channel 20, 30, 40, 50, 60 preferably within shortly after the customer 10 request is received or where a placeholder representing terminated contact reaches a selected queue position (e.g., such as the head of the queue). The callback message, which can be a prerecorded email, facsimile or text message or an agent leaving a voice mail message, includes the priority access code and time frame the access code is valid. Note, the callback message could additionally include a different telephone number to callback to access the call center or a different url to initiate a callback web chat. One reason to provide a different telephone number or url is to provide the customer 10 with the telephone access number or url of an alternate location that is least likely to be busy when the customer 10 calls back.

In step 400, the customer 10 receives the callback message including the priority shortcut access code and the appropriate time to use the priority access code to access the call center. In step 410, the use of the priority access code causes the access code agent to retrieve customer account information from the customer database 260.

The access code agent retrieves from the customer database 260 the time frame this priority access code is valid and a pointer to the customer entry in the customer database to retrieve customer information. (FIG. 5C, 610). The access code agent verifies the priority access code is valid and interfaces with the ACD 120. If the priority access code is valid, the customer call moves to the head of a queue or close to the head of the queue with a priority status. In step 420, the ACD 120 provides the customer information along with the customer's name to the agent either via a screen pop before the agent receives the telephone call (or web chat contact). Alternatively, the customer's name at least is spoken before the agent receives the telephone call (or web chat call).

Figure 4:
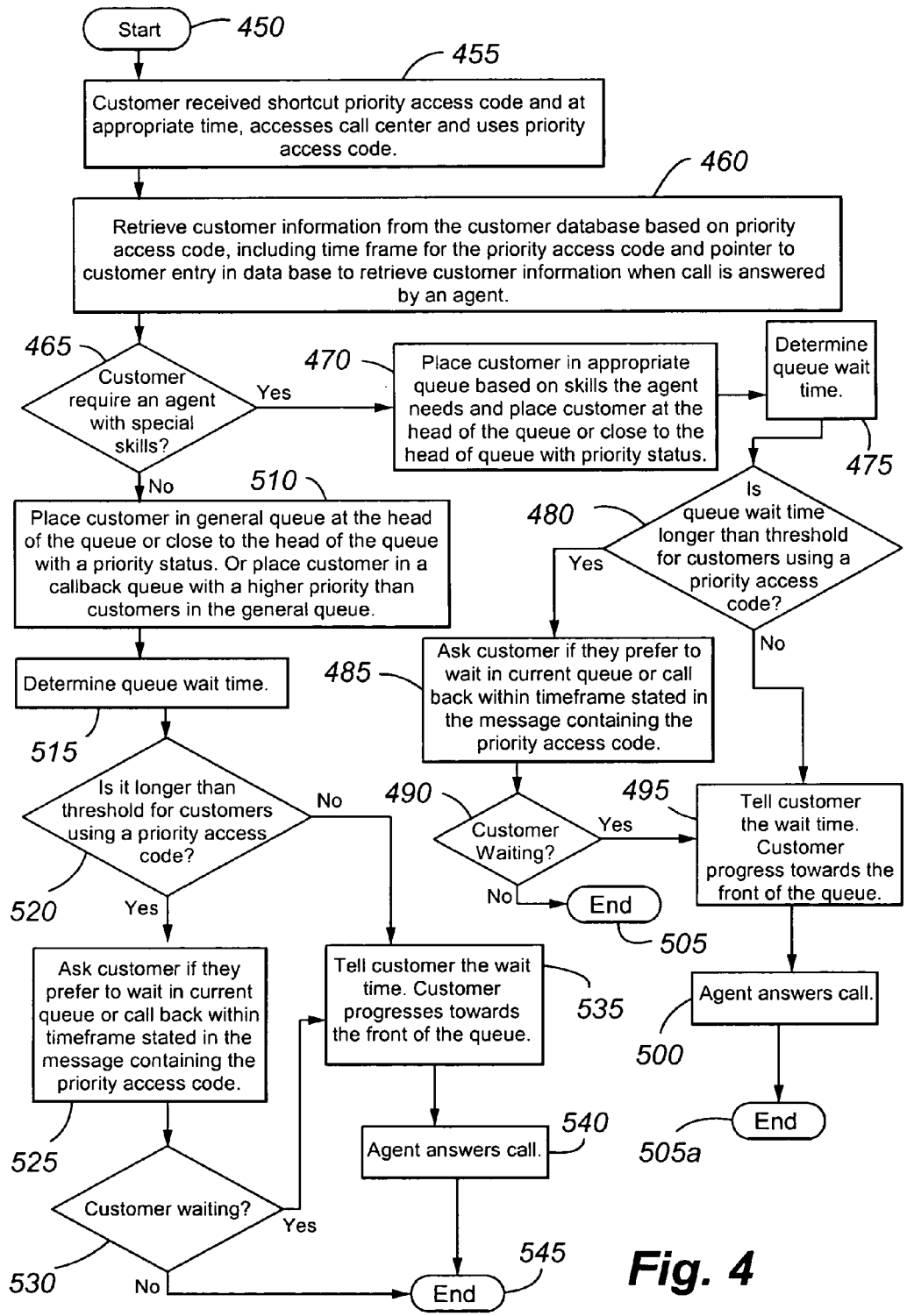
FIG. 4 is a flow chart of a contact center handling a customer callback according to an embodiment of the present invention.

FIG. 4 is a flow diagram of the present invention demonstrating how the present invention handles the customer's callback in more detail when the customer calls the IVR 110 access number. In step 455, the customer 10 receives the priority access code via the callback message. While the priority access code is valid, the customer calls back the call center and enters the priority access code. The call is placed in an ACD 120 queue. In step 460, the access code agent uses the priority access code to retrieve information from the customer database. This information includes the time frame the priority access code is valid and a pointer to the customer entry in the customer database 260 to retrieve customer information when the call is answered by an agent. The access code agent verifies the customer 10 is using the priority access code within the valid time frame based on the retrieved time frame information and allows the call to proceed in the ACD queue 120.

If the customer 10 uses the priority access code outside the valid time frame, the access code agent interfaces with the IVR 110. The IVR 110 notifies the customer 10 "The priority access code is not valid at the moment. You may wait in the present queue or call back when the priority access code is valid beginning <time frame in callback message.> The queue wait time is <X minutes.>" Such notification is provided to the customer 10 to alleviate long queues at the call center as the customer may have called back when the call center is still busy.

The transaction type channel (FIG. 5A, 600) may also be retrieved from the customer entry in the database 260 if skills-based routing is used in the call center. The transaction type channel provides the information regarding how the customer 10 originally contacted the call center. It answers the question how did the customer 10 contact the call center: by web chat, email, facsimile, or phone and if by phone what was the access number dialed? Such information helps to determine whether an agent with special skills is required to resolve the customer's problem or answer the customer's question. As might be the case, if the customer 10 originally contacted the call center using a toll free telephone number which is provided only on product promotions played on Spanish speaking radio stations or TV stations.

In step 465, if skills based routing is used to route contacts, the access code agent determines whether the customer 10 requires an agent with special skills. Such as would also be the case if the customer 10 initiated a web chat, or email or facsimile and hence the agent may need to have specialized computer skills to respond to the customer. In step 470, if the customer 10 does require an agent with special skills, the access code agent interfaces with the ACD 120 and places the customer 10 in an appropriate queue based on the required skills. The customer 10 is placed either at the head of the queue or close to the head of the queue with a priority status. In step 475, the access code agent interfaces with the ACD 120 to determine the queue wait time.

In step 480, the access code agent compares the queue wait time and a threshold set for customers using a priority access code. The threshold may be computed by the access code agent, based on marketing information, or call center statistics indicating the amount of time a customer using a priority access code is willing to wait in a queue. Of course, the access code agent may interface with ACD 120 to determine whether an alternate queue exists where the queue wait time is less than the threshold and the agents have the skills to resolve the customer's inquiry. If an alternative queue exists, the access code agent may interface with the ACD 120 to move the customer call to the alternate queue. However if the queue wait time is longer than the threshold, in step 485, the access code agent interfaces with the IVR 110. IVR 110 notifies the customer 10 of the queue wait time and prompts the customer 10 whether they prefer to wait in the current queue or call back within the time frame the priority access code remains valid.

In step 490, the access code agent interfaces with the ACD 120 to determine whether the customer 10 remained in the queue. In step 505, if the customer 10 hung up and dropped out of the queue, the access code agent records the queue wait time and the amount of time the customer 10 was in the queue for the call center statistics. The access code agent also notes in the customer database 260, the customer's attempt to callback the call center. Such information may be used to provide these customers even a higher priority status the next time they call, or some acknowledgment or thanks for their repeated attempts to contact the call center.

After step 480, if the queue wait time is shorter than the threshold, or the customer 10 remained in the queue after step 490, in step 495, the access code agent interfaces with the IVR 110. The IVR 110 notifies the customer 10 of the queue wait time. The access code agent interfaces with the ACD 120 and the customer 10 continues progressing to the front of the queue. In step 500 before the agent answers the call, the access code agent interfaces with the ACD 120 and uses the pointer to the customer entry in the customer database 260 to retrieve and provide customer information to the agent, for example, via a screen pop. In step 505, the call ends and the customer hangs up.

If the customer 10 does not require an agent with special skills or the call center does not use skills based routing, in step 510, the access code agent interfaces with the ACD 120 to place the customer 10 in the general queue at the head of the queue or close to the head of the queue with a priority status.

In step 515, the access code agent interfaces with the ACD 120 to determine the queue wait time. In step 520, the access code agent compares the queue wait time and a threshold set for customers using a priority access code. The threshold may be computed by the access code agent, based on marketing information, or call center statistics indicating the amount of time a customer using a priority access code is willing to wait in a queue. Again, the access code agent may interface with ACD 120 to determine whether an alternate queue exists where the queue wait time is less than the threshold and the agents have the skills to resolve the customer's inquiry. If an alternative queue exists, the access code agent may interface with the ACD 120 to move the customer call to the alternate queue. However if the queue wait time is longer than the threshold, in step 525, the Shortcut Access code interfaces with the IVR 110 to notify the customer 10 of the queue wait time and prompt the customer 10 whether they prefer to wait in the current queue or call back within the time frame stated in the callback message.

In step 530, the access code agent interfaces with the ACD 120 to determine whether the customer 10 remained in the queue. In step 545, if the customer 10 hung up and dropped out of the queue, the Shortcut Access code records the queue wait time and the amount of time the customer 10 was in the queue for the call center statistics. The access code agent also notes in the customer database 260, the customer's attempt to callback the call center. Such information may be used to provide these customers even a higher priority status the next time they call, or some acknowledgment or thanks for their repeated attempts to contact the call center.

After step 520, if the queue wait time is shorter than the threshold, or the customer remained in the queue after step 530, in step 535, the access code agent interfaces with the IVR 110. The IVR 110 notifies the customer 10 of the queue wait time. The access code agent interfaces with the ACD 120 and the customer 10 continues progressing to the front of the queue. In step 540 before the agent answers the call, the access code agent interfaces with the ACD 120 and uses the pointer to the customer entry in the customer database 260 to retrieve and provide customer information to the agent, for example, via a screen pop. In step 545, the call ends and the customer 10 hangs up.

FIG. 5A shows data structure 600 as an example of how to organize the customer 10 contact information collected by the IVR 110 or a web page to ensure the customer 10 receives the callback message via the customer preferred channel. IVR 110 records the customer voice response or uses DTMF to collect the customer information. The customer information includes the customer's first and last name, the subject matter of the customer's call, the customer's contact information (identified as type PHONE, EMAIL, FAX, PAGER, SMS) and convenient timeframe for the customer 10 to contact the business. After each piece of data is recorded, the IVR 110 repeats the entry to the customer 10 and allows the customer 10 to revise the entry as appropriate.

If the customer initiated a web chat and contact information is collected via the web, the web server 140 presents a web page to the customer 10 to enter the customer's information. If the customer 10 has a keyboard and mouse connected to PC 60, the entry may be typed into the web page. The information is temporarily stored on the web server 140 as a text file using data structure 600 and later stored in the customer database 260. Alternatively, if the customer 10 has a microphone connected to PC 60, the entry may be recorded as a .WAV file, for example, and downloaded from the customer's PC 60 to the web server 140 for temporary storage. In this case, the access code agent interfaces with the web server 140 and IVR 110 to interpret the voice recording using the IVR 110 ASR resources. The ASR resources convert the recording to text, which is then stored in the customer database 260. Of course, an available agent may be used to listen to the recording, translate the recording to text and store the information in the customer database 260.

If the customer 10 contacted the call center via email or facsimile, the customer's email address or facsimile number, the subject matter of the contact, and first and last name on the message are collected from the message and stored in the data structure 600. If desired, the body of the message may also be stored in customer database 260.

Additionally, the IVR 110 collects the DNIS or ANI telephone number and notes the contact information as the PHONE transaction channel type. For contacts via email, the sender's email address is stored in the EMAIL transaction channel type. For transactions via facsimile, the sender's facsimile number is stored in the FAX transaction channel type.

Transaction channel type information helps determine whether skills based routing is required. Skills based routing may be needed, for example, when a customer uses the web, email or facsimile channel to contact the call center, a special access telephone number is used for foreign speaking customers, or customers are seeking technical support. In these cases, agents responding to questions from customers in a general queue may not have the computer skills required to efficiently assist customers in a web chat, email or facsimile queue, speak to foreign customers, or the technical skills to answer questions in the technical support queue. Hence, the call center may have separate queues to handle these particular situations and agents assigned to one or more queues depending on the skills required to answer calls from a particular queue. Additionally, the transaction channel type information is useful when an error occurs sending the callback message using the customer preferred contact information. In this case, an agent attempting to resend the callback message may want to use the transaction channel type information instead of the customer preferred contact information to reduce the number of times the callback message is resent.

FIG. 5B shows data structure 605 as an example of one way to organize the callback message transaction request. The access code agent interfaces with ACD 120 to send the callback message via the channel requested by the customer. The access code agent software may use a random number generator or some other scheme to generate a transaction number for each requested callback message and assign a priority code to this transaction. The access code agent also computes the time frame the priority access code is valid. The time frame is derived preferably using the time frame provided by the customer 10 and the time frame the particular agent queue answering this particular call is least likely to be busy. The computed time frame the priority access code may be valid for a period of hours, days or for a period of hours between certain days.

To ensure the callback message is sent via the customer preferred channel, the data structure 605 shows an associated channel type to send the callback message to ensure the customer 10 is contacted as requested. As shown in FIG. 5B, the contact types include telephone or cell phone (PHONE), email address (EMAIL), facsimile number (FAX), pager (Pager), text messaging pager or cell phone (SMS). The channel type also includes the customer's preferred contact address, which is used to send the callback message to the customer.

Additionally, data structure 605 also includes a pointer to the customer entry in the customer database 260 which links the data structure 605 to the customer information already existing in the customer database 260.

FIG. 5C shows data structure 610 as an example of one way to organize the information the access code agent uses to queue the customer call when the customer 10 calls back using the priority access code. Once the priority access code is entered by the customer, the access code agent retrieves from the customer database 260 the time frame this priority access code is valid and a pointer to the customer entry in the customer database 60. The access code agent verifies the priority access code is valid and interfaces with the ACD 120 to move the customer call to the head of a queue or close to the head of the queue with a priority status. The pointer to the customer entry in the customer database 260 provides the customer information to the agent either via a screen pop before the agent receives the telephone call (or web chat contact). Alternatively, the customer's name at least is spoken before the agent receives the telephone call (or web chat call).

A number of variations and modifications of the invention can be used. It would be possible to provide for some features of the invention without providing others.

For example in one alternative embodiment, the logic of the present invention is implemented as software, hardware (e.g., logic circuit), or as a combination thereof.

In another alternative embodiment, the access code agent is configured to provide the customer, upon callback, with a queue position at least comparable to the best queue position the customer possessed before termination of the earlier call during which the customer was requested and/or was assigned the access code. This is effected by comparing the selected queue position that the customer on callback would ordinarily be assigned with the previously assigned queue position. If the selected queue position is less advanced than the previously assigned queue position, the customer on the callback is assigned the same queue position as the previously assigned queue position. Rather than focusing on queue position, the agent may instead focus on estimated wait time. In other words, the lowest estimated wait time that the customer experienced in the earlier call is compared to the estimated wait time that the customer would ordinarily be assigned in the callback. The customer is provided with a queue position having an estimated wait time that is no more than the previously experienced estimated wait time.

In yet another embodiment, the access code agent is configured to provide the access code to the customer during the current contact and to require the customer to call back no earlier than a selected time. This prevents customers from dropping out of a busy queue to be assigned an access code and thereby receive preferred treatment over other enqueued contacts. For example, the access code could be enabled only after expiration of the selected time, which can be the same as the expected wait time before the customer's current contact is serviced. Alternatively, a standard time interval can be selected and used for all contacts.

In yet another embodiment, the access code could be provided to the customer in the current contact or in a later contact by the same or a different communication medium. For example, the access code could be provided to the customer when the customer calls back and is authenticated. Alternatively, the access code could be provided to the customer in a later contact initiated by the contact center.

In yet another embodiment, each queue is assigned a set of unique access codes. An access code for a first queue could not be used to access a second different queue. In this manner, customers in a queue requiring a lower skill set for servicing could not use an access code assigned while residing in the queue in another queue requiring a higher skill set. Normally, the lower skilled queue will have more processing resources than the higher skilled queue. Alternatively, the code could be enabled only for a specific medium. For example, a code provided for a voice call could not be used later by the same customer in a chat session or instant messaging session and vice versa.

In yet another embodiment, only a finite number of access codes are assigned contact center wide or for each queue. Placing a limitation on the number of unexpired access codes that are assignable at any one time or within a selected time interval can avoid contact center congestion problems due to multiple customers calling back at the same time demanding preferential treatment.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those Claimed, whether or not such alternate, interchangeable and/or equivalent structures, functions, ranges or steps are disclosed herein, and without intending to publicly dedicate any patentable subject matter.

What is claimed is:

1. A method for servicing contacts in a contact center, comprising:
   (a) providing at least one queue comprising a plurality of enqueued contacts, the at least one queue being serviced by at least one resource;
   (b) selecting at least a first enqueued contact of the plurality of enqueued contacts, the at least a first enqueued contact having a corresponding first queue position in the at least one queue and being associated with a first customer;
   (c) upon the occurrence of a selected event, assigning an access code to the at least a first enqueued contact; wherein the selected event is at least one of a selected queue occupancy level and a selected projected wait time; and
   (d) after the first enqueued contact is disconnected, receiving, from the first customer, the access code, wherein, when the access code is received from the first customer, the first customer can receive a second queue position that is one of (di) the same as the first queue position, (dii) closer to the head of the at least one queue than the first queue position, and (diii) in a higher priority queue than the at least one queue containing the first enqueued contact and wherein at least one of the following is true of the access code: (D1) the access code is provided to the first customer after call disconnection when a placeholder having the first queue position advances to a selected queue position different than the first queue position, and (D2) the access code is one of a plurality of access codes and the access code is valid only for a specified communication medium, and wherein other access codes in the plurality of access codes are used for differing communication media.

2. The method of claim 1, wherein the access code is not activated until expiration of an estimated wait time.

3. The method of claim 2, further comprising:
   (e) determining an estimated wait time for the first enqueued contact; and
   (f) activating the access code no earlier than the expiration of the estimated wait time.

4. The method of claim 1, wherein the access code is valid for only one queue in the at least one queue, with a different queue in the at least one queue having a different access code.

5. The method of claim 4, wherein the at least one queue comprises a plurality of different queues, wherein the access code is valid for a first queue of the plurality of queues and not with a second queue of the plurality of queues, and wherein a second different access code is valid for the second queue.

6. The method of claim 1, wherein (D1) is true.

7. The method of claim 6, wherein, following disconnection of the first enqueued contact, a placeholder associated with the first customer in the first queue position is advanced towards a head of the at least one queue as if the first enqueued contact were still connected and wherein the second queue position is a position of the placeholder when the later contact is received.

8. The method of claim 7, further comprising:
   (e) providing the access code to the first customer after the first enqueued contact is disconnected, wherein the access code is provided only when the placeholder reaches a specified queue position in the at least one queue.

9. The method of claim 8, wherein the access code is provided to the first customer, after disconnection of the first enqueued contact, on a different communication medium than the communication medium used for the first enqueued contact.

10. The method of claim 9, further comprising:
(f) receiving from the first customer a selected type of medium for the providing step.

11. The method of claim 9, further comprising:
(f) receiving a name of the first customer and one or more of a telephone number of the first customer, an email address of the first customer, a facsimile number of the first customer, a pager number of the first customer, and a text messaging address of the first customer, the access code being provided, after a selected time following disconnection of the first enqueued contact, to the text messaging address.

12. The method of claim 1, wherein (D2) is true.

13. The method of claim 1, further comprising:
(e) comparing the at least one of a queue occupancy level and a queue wait time to a selected threshold;
(f) when the at least one of a queue occupancy level and queue wait time exceeds the selected threshold, performing step (d); and
(g) when the at least one of a queue occupancy level and queue wait time is less than the selected threshold, not performing step (d).

14. The method of claim 12, wherein the first enqueued contact is one of a telephone call, email, instant message, facsimile, and web chat and wherein the access code is valid only for the one of a telephone call, email, instant message, facsimile, and web chat and not for another of the one of a telephone call, email, instant message, facsimile, and web chat.

15. The method of claim 13, further comprising:
(e) when the at least one of a queue occupancy level and queue wait time exceeds the selected threshold, prompting the first customer whether the first customer would terminate the first enqueued contact in exchange for the access code but not prompting the first customer when the at least one of a queue occupancy level and wait time fails to exceed the selected threshold.

16. The method of claim 15, further comprising:
(f) when the first customer elects to terminate the first enqueued contact, performing step (d), and
(g) when the first customer does not elect to terminate the first enqueued contact, not performing step (d).

17. The method of claim 1, wherein the first queue position is in the first queue and the second queue position is in a second different queue.

18. The method of claim 1, further comprising:
(e) receiving from the first customer a desirable time for recontacting the contact center; and
(f) determining whether the desirable time is acceptable for the contact center; and
(g) when the desirable time is acceptable, providing the access code to the first customer, the access code being valid for the desirable time.

19. The method of claim 1 further comprising:
(e) assigning a time to live to the access code, wherein the access code is invalid after expiration of the time to live.

20. The method of claim 1, further comprising:
(e) storing, after the assigning step, the access code, a time stamp associated with the access code, and at least one of a telephone number and address associated with the first customer.

21. The method of claim 1, wherein the at least one queue comprises at least a first queue and a second queue, each of the first queue and second queue having a limit on the number of access codes, during a selected time interval, that may be used by a customer to bypass enqueued contacts.

22. The method of claim 1, wherein the at least one queue comprises at least a first queue and a second queue, wherein an access code assigned for the first queue cannot be used by a customer for the second queue.

23. The method of claim 1, wherein the access code is valid only for a specified type of communication medium and not for other types of communication media and wherein a time period of validity of the access code corresponds to a time frame in which the contact center is historically not busy.

24. The method of claim 1, wherein (di) is true and further comprising the step of:
(e) prompting the first customer to record contact information by selecting from options regarding how to send a message providing instructions for recontacting the contact center.

25. The method of claim 1, further comprising:
(e) when the later contact from the first customer is received, comparing the first queue position with a third queue position, the third queue position being the queue position the later contact would be entitled to receive in the absence of the access code and applying the following rules:
(E1) when the third queue position is less advanced towards a head of the at least one queue than the first queue position, the first and second queue positions are the same; and
(E2) when the third queue position is more advanced towards the head of the at least one queue than the first queue position, the second and third queue positions are the same.

26. The method of claim 1, further comprising:
(e) when the later contact from the first customer is received, comparing a first wait time with a second wait time, the first wait time being associated with the first enqueued contact and the second wait time being associated with the later contact in the absence of the access code and applying the following rules:
(E1) when the first wait time is longer than the second wait time, selecting the second queue position to have a wait time less than or equal to the second wait time; and
(E2) when the first wait time is shorter than the second wait time, selecting the second queue position to have a wait time less than or equal to the first wait time.

27. The method of claim 1, wherein (diii) is true.

28. The method of claim 27, wherein the access code is at least one of a telephone number and an address and wherein (dii) is true.

29. A non-transitory computer readable medium encoded with processor executable instructions that, when executed, perform the steps of claim 1.

30. A contact center, comprising:
(a) at least one queue comprising a plurality of enqueued contacts;
(b) at least one resource operable to service the at least one queue; and (c) an access code agent operable to: (C1) select at least a first enqueued contact of the plurality of enqueued contacts, the at least a first enqueued contact having a corresponding first queue position in the at least one queue and being associated with a first customer, (C2) assign an access code to the at least a first enqueued contact, wherein the access code is valid only upon occurrence of a selected event, wherein the selected event is at least one of a expiration of a contact center selected time, expiration of a customer selected time, and advancement of a placeholder associated with the first enqueued contact to a selected queue position; and (C3), after the first enqueued contact is disconnected, receive, from the first customer, the access code, wherein, when the access code is received from the first customer in a later contact, the first customer can receive a second queue position that is one of (i) the same as the first queue position; (ii) closer to the head of the at least one queue than the first queue position; and (iii) in a second queue different from the queue containing the first queue position, and wherein at least one of the following is true of the access code: (1) the access code is provided to the first customer after call disconnection when a placeholder having the first queue position advances to a selected queue position different than the first queue position, and (2) the access code is valid only for a specified communication medium, with differing access codes being used for differing communication media.

31. The contact center of claim 30, wherein the access code is not activated until expiration of an estimated wait time.

32. The contact center of claim 31, wherein the access code agent is further operable to:
determine an estimated wait time for the first enqueued contact; and
activate the access code no earlier than the expiration of the estimated wait time.

33. The contact center of claim 30, wherein the access code is valid for only one queue, with different queues having different access codes.

34. The contact center of claim 33, wherein the at least one queue comprises a plurality of different queues, wherein the access code is valid for a first queue of the plurality of queues and not with a second queue of the plurality of queues, and wherein a second different access code is valid for the second queue.

35. The contact center of claim 30, wherein (1) is true.

36. The contact center of claim 35, wherein, following disconnection of the first enqueued contact, a placeholder associated with the first customer in the first queue position is advanced towards a head of the at least one queue as if the first enqueued contact were still connected and wherein the second queue position is a position of the placeholder when the later contact is received.

37. The contact center of claim 36, wherein the access code agent is further operable to provide the access code to the first customer after the first enqueued contact is disconnected, wherein the access code is provided only when the placeholder reaches a specified queue position in the at least one queue.

38. The contact center of claim 37, wherein the access code is provided to the first customer, after disconnection of the first enqueued contact, on a different communication medium than the communication medium used for the first enqueued contact.

39. The contact center of claim 38, wherein the access code agent is further operable to receive from the first customer a selected type of medium for the providing step.

40. The contact center of claim 39, wherein the access code agent is further operable to receive a name of the first customer and one or more of a telephone number of the first customer, an email address of the first customer, a facsimile number of the first customer, a pager number of the first customer, and a text messaging address of the first customer, the access code being provided, after a selected time following disconnection of the first enqueued contact, to the text messaging address.

41. The contact center of claim 30, wherein (2) is true.

42. The contact center of claim 30, wherein the access code is assigned only upon occurrence of a contact center state, wherein the contact center state is at least one of a queue occupancy level and a queue wait time, and wherein the access code agent is further operable to (4) compare at least one of a queue occupancy level and a queue wait time to a selected threshold; (5) when the at least one of a queue occupancy level and queue wait time exceeds the selected threshold, perform function (3); and (6) when the at least one of a queue occupancy level and queue wait time is less than the selected threshold, not perform function (3).

43. The contact center of claim 30, wherein the first enqueued contact is one of a telephone call, email, instant message, facsimile, and web chat and wherein the access code is valid only for the one of a telephone call, email, instant message, facsimile, and web chat and not for another of the one of a telephone call, email, instant message, facsimile, and web chat.

44. The contact center of claim 30, wherein the agent is further operable to determine an estimated wait time for the first enqueued contact and activate the access code no earlier than the expiration of the estimated wait time.

45. The contact center of claim 30, wherein the agent is further operable to, when the later contact from the first customer is received, compare the first queue position with a third queue position, the third queue position being the queue position the later contact would be entitled to receive in the absence of the access code and apply the following rules:
when the third queue position is less advanced towards a head of the at least one queue than the first queue position, the first and second queue positions are the same; and
when the third queue position is more advanced towards the head of the at least one queue than the first queue position, the second and third queue positions are the same.

46. The contact center of claim 30, wherein the agent is further operable to (4) when the later contact from the first customer is received, compare a first wait time with a second wait time, the first wait time being associated with the first enqueued contact and the second wait time being associated with the later contact in the absence of the access code and (5) apply the following rules:
when the first wait time is longer than the second wait time, selecting the second queue position to have a wait time less than or equal to the second wait time; and
when the first wait time is shorter than the second wait time, selecting the second queue position to have a wait time less than or equal to the first wait time.

* * * * *

UNITED STATES PATENT AND TRADEMARK OFFICE
CERTIFICATE OF CORRECTION

| | | |
|---|---|---|
| PATENT NO. | : 8,472,612 B1 | Page 1 of 1 |
| APPLICATION NO. | : 10/768894 | |
| DATED | : June 25, 2013 | |
| INVENTOR(S) | : Chris Goringe et al. | |

It is certified that error appears in the above-identified patent and that said Letters Patent is hereby corrected as shown below:

In the Claims:

Column 15, Line 33, please delete "chat and" and insert --chat, and-- therein.

Column 15, Line 56, please delete "center; and" and insert --center;-- therein.

Signed and Sealed this
Eighteenth Day of February, 2014

Michelle K. Lee
*Deputy Director of the United States Patent and Trademark Office*